(12) United States Patent
Bobzien et al.

(10) Patent No.: US 6,536,710 B1
(45) Date of Patent: Mar. 25, 2003

(54) OVERHEAD LATTICE SUPPORT STRUCTURE

(75) Inventors: Phillip J. Bobzien, Snohomish, WA (US); Michael D. Jacoby, Kirkland, WA (US); Jeffrey S. Janes, Beaverton, OR (US); Robert M. Dowdell, Everett, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/071,997

(22) Filed: Feb. 6, 2002

(51) Int. Cl.[7] .................................................. B64C 1/00
(52) U.S. Cl. ...................................... 244/119; 244/125
(58) Field of Search .............................. 244/119, 118.1, 244/118.5, 125, 131, 133

(56) References Cited

U.S. PATENT DOCUMENTS

| | | | |
|---|---|---|---|
| 3,742,674 A | | 7/1973 | Lang |
| 4,050,208 A | | 9/1977 | Pompei et al. |
| 4,621,780 A | * | 11/1986 | Doyhamboure et al. ..... 105/396 |
| 4,648,570 A | * | 3/1987 | Abdelmaseh et al. ... 244/117 R |
| 4,799,631 A | | 1/1989 | Humphries et al. |
| 5,083,727 A | | 1/1992 | Pompei et al. |
| 5,129,597 A | * | 7/1992 | Manthey et al. .......... 244/118.5 |
| 5,201,831 A | * | 4/1993 | Higgins et al. ........... 244/118.5 |
| 5,314,143 A | | 5/1994 | Luria |
| 5,716,027 A | * | 2/1998 | Hart et al. ................ 244/118.1 |
| 5,842,668 A | * | 12/1998 | Spencer .................... 244/118.1 |
| 5,938,149 A | * | 8/1999 | Terwesten ................ 244/118.5 |
| 6,003,812 A | * | 12/1999 | Micale et al. ............ 244/117 R |
| 6,003,813 A | * | 12/1999 | Wentland et al. ......... 244/118.5 |
| 6,073,883 A | * | 6/2000 | Ohlmann et al. ............ 105/316 |
| 6,105,902 A | * | 8/2000 | Pettit .......................... 244/119 |
| 6,182,926 B1 | | 2/2001 | Moore |
| 6,241,186 B1 | * | 6/2001 | Calnon .................... 244/118.5 |

* cited by examiner

*Primary Examiner*—Charles T. Jordan
*Assistant Examiner*—Stephen A. Holzen
(74) *Attorney, Agent, or Firm*—DiPinto & Shimokaji, PC

(57) ABSTRACT

Disclosed is an apparatus and method for supporting the center stowage bins, center monuments, aircraft systems, and overhead modules, such as attendant rests, for commercial aircraft. Use of an overhead lattice support structure provides an efficient structural support system for the passenger luggage center stowage bins, and also provides the necessary overhead space to accommodate modules, such as crew rests, as well as essential aircraft systems, including ducts, tubes, electrical wiring, and electrical equipment. The overhead lattice support structure also simplifies aircraft assembly operations by allowing more systems (ducting and electrical) to be pre-installed in a back shop rather than in a final assembly line.

39 Claims, 3 Drawing Sheets

OVERHEAD LATTICE SUPPORT STRUCTURE

BACKGROUND OF THE INVENTION

The present invention generally relates to apparatus and methods for structural support of aircraft passenger internal fuselage appendages, and more specifically, to apparatus and methods, which support the center stowage bins, center monuments, aircraft systems, and overhead modules, such as attendant rests, for commercial aircraft.

Wide bodied commercial aircraft are characterized as having significant space above passenger center stowage bin compartments and below the airplanes' overhead airframe (or crown). That space, however, is utilized entirely for the center stowage bin support structure, and thus, is unavailable for any other purpose. As a result, space must be found elsewhere to route ducting, tubing, and electrical harnesses, and to house electrical equipment and other essential aircraft systems. Since space for that purpose is scarce, it is often necessary to employ complex and cramped routing schemes and to locate equipment in spaces that are difficult to access for initial installation as well as for subsequent maintenance. The overall result is an increase in assembly and maintenance costs.

Many wide bodied commercial aircraft are also designed for extreme long-range routes and may sometimes remain in flight for up to approximately twenty hours. In such situations, it is necessary to provide rest areas for the crews, including pilots and passenger attendants. When no other provision has been made, the crews utilize designated seats in the passenger compartments, thus making those seats unavailable for paying passengers and reducing the airplane's earning capacity.

In a few special cases, separate, dedicated, crew rest facilities have been provided. An example is the Boeing 747 aircraft's Door 5 Crew Rest module. That crew rest, however, is unique and customized for that particular aircraft configuration, and thus cannot be moved to allow customer variability. Additionally, that design utilizes a support structure not adaptable to other, smaller aircraft, such as the Boeing 777, which has more limited space in the crown. Another example is the Boeing 777 Door 3 Crew Rest module, which is also a highly customized design intended for after-market retrofit, and which cannot be moved to other locations to allow for customer variability.

As can be seen, there is a need for an efficient structural support system which supports the center stowage bin in such a manner as to also free-up the space above the stowage bin and below the airplane overhead airframe, making that space available to route ducting, tubing, and electrical harnesses, to house electrical equipment and other essential aircraft systems, and to also accommodate overhead modules, such as attendant rests.

SUMMARY OF THE INVENTION

In one aspect of the present invention, there is disclosed a lattice support structure which provides overhead space and structural support for center stowage bins, for aircraft systems, and for overhead modules. It is comprised of: horizontally oriented lattice beams secured to vertically oriented stanchions; angled braces connected diagonally between the horizontally oriented lattice beams and the vertically oriented stanchions; horizontally oriented trough shaped cross members secured to the stanchions; vertically oriented tie rods securing the horizontally oriented lattice beams to the airplane's fuselage transverse frame; lateral tie rods securing the horizontally oriented lattice beams to the airplane's fuselage transverse frame; fuselage rail beams connected to the outermost end of horizontally oriented lattice beam; horizontally oriented structural panels, comprised of a shear panel and two rail beams, connected to the innermost end of each horizontally oriented lattice beams; and, vertically oriented structural trusses connected to the innermost end of horizontally oriented lattice beams, which are comprised of diagonal tension members extending between two rail beams.

In another aspect of the present invention, there is disclosed a lattice support structure which provides overhead space and structural support for stowage bins, aircraft systems, and overhead modules. It is comprised of: lattice beams secured to stanchions; angled braces connected between the lattice beams and the stanchions; cross members secured to the stanchions; tie rods securing the lattice beams to the airplane's fuselage transverse frame; lateral tie rods securing the lattice beams to the airplane's fuselage transverse frame; airplane fuselage rail beams connected to the ends of each lattice beam; two structural panels connected to the innermost ends of each lattice beam; and, two structural trusses connected to the innermost end of the lattice beams.

In yet another aspect of the present invention, there is disclosed a lattice support structure which is interconnected and spaced apart to provide overhead space and structural support for center stowage bins, for aircraft systems, and for overhead modules. It is comprised of horizontally oriented lattice beams, vertically oriented stanchions, vertically oriented structural trusses, angled braces, horizontally oriented cross members, vertically and laterally oriented tie rods, and horizontally oriented structural panels.

In yet one final aspect of the present invention, there is disclosed a method of accommodating and supporting overhead stowage bins, modules and aircraft systems, comprising the steps of suspending a lattice support structure from the overhead structure of an aircraft's fuselage, locating overhead stowage bins on each side of the underside of the suspended lattice support structure, locating modules on the center segment of the suspended overhead stowage bins, and locating aircraft systems and components on each side of the upper side of the suspended lattice support structure.

These and other features, aspects and advantages of the present invention will become better understood with reference to the following drawings, descriptions and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The inventive overhead lattice support structure may be used on passenger aircraft, such as the wide-bodied Boeing 777, as the apparatus and method for supporting center stowage bins, center monuments, aircraft systems, and overhead modules. It differs from prior art in that it frees the space above the stowage bin and below the airplanes' overhead airframe, making that space available to route ducting, tubing, and electrical harnesses, to house electrical equipment and other essential aircraft systems, and to also accommodate overhead modules, such as attendant rests.

Figure 1:
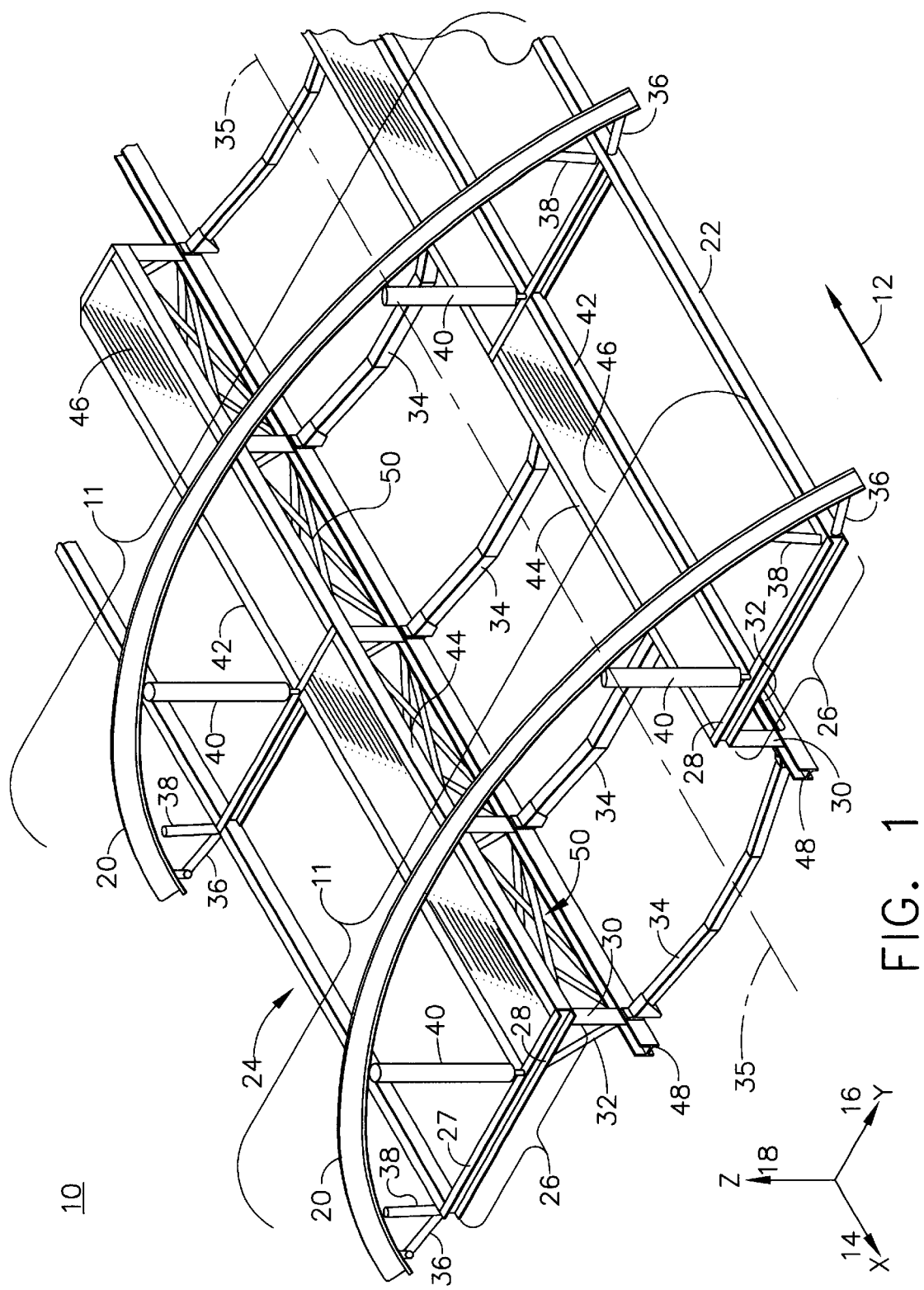
FIG. 1 is a partial perspective view of the inventive overhead lattice support structure interfacing with an aircraft fuselage.

Referring to the accompanying drawings (in which like reference numerals indicate like parts throughout several views), and in particular to FIG. 1, there is shown a partial perspective view of the inventive lattice support structure 10 as it interfaces with structural elements of a wide bodied commercial aircraft, such as a Boeing 777. For orientation purposes, arrow 12 points to the forward direction of the aircraft, and arrows 14, 16 and 18 indicate, in corresponding order, the x-axis, the y-axis, and the z-axis. The lattice support structure 10 interfaces with and is secured to the aircraft's crown, in the z-axis 18 direction, at the fuselage transverse frames 20. It additionally interfaces with and is secured to the aircraft's sides at the right outboard rail 22 and at the left outboard rail 24, on opposing ends of the y-axis 16.

The lattice support structure 10 may be principally comprised of a plurality of cross sectional structural elements 11 rigidly interconnected to each other along the length of the aircraft's passenger compartment, by means of rails, shear panels, and diagonal members (all described in detail below). In one embodiment, all lattice support structure 10 elements may be made of aluminum alloys commonly used for transport aircraft applications known to those skilled in the art. Other material, however, may be used. Additionally, all structural connections between lattice support structure 10 elements may also be of the type normally employed for airframe structures, such as bolts or rivets, and which are also well known to those skilled in the art.

The cross sectional structural elements 11 of the lattice support structure 10 may be comprised of a lineally shaped lattice beam 26, said beam being further comprised of an outboard lattice beam 27 structurally continuous with an inboard lattice beam 28, oriented in the y-axis 16 direction, which may be connected, at approximately a right angle, to a stanchion 30 oriented downward in a z-axis 18 direction, said stanchion 30 being further connected at its opposing end to a trough shaped cross member 34 oriented in a y-axis 16 direction and traversing across the aircraft's centerline 35 to symmetrically shaped and opposingly oriented structural elements. Angled braces 32 may be provided between the inboard lattice beams 28 and stanchions 30 to provide a diagonally directed load path between them.

The cross sectional structural elements 11 of the lattice support structure 10 may be rigidly secured to the aircraft's fuselage structure as follows: lateral tie rods 36, oriented in a y-axis 16 direction, may connect the ends of the outboard lattice beams 24 to the fuselage transverse frames 20; outboard vertical tie rods 38, oriented in a z-axis 18 direction, may connect the outboard lattice beams 27 to the fuselage transverse frames 20 and to the right outboard rail 22 and left outboard rail 24, correspondingly; and inboard vertical tie rods 40, also oriented in a z-axis 18 direction, may connect the inboard lattice support beams 28 to the fuselage transverse frames 20. To provide a continuous load path, the inboard vertical tie rods 40 may interface with the inboard lattice support beams 28 at the same lateral location as the angled braces 32.

Still referring to FIG. 1, the cross sectional structural elements 11 of the lattice support structure 10 may be rigidly interconnected to each other along the longitudinal direction of the aircraft's fuselage as follows: the outboard lattice beams 27 may be connected to each other at the outermost points on each side of the aircraft by right outboard rails 22 and left outboard rails 24; the inboard lattice beams 28 on each side of the aircraft may be connected to each other by means of a rectangular shaped horizontally, x-axis 14, oriented structural panel comprised of a shear panel 46 sandwiched between an outboard upper rail 42 and an inboard upper rail 44; and, vertically oriented, z-axis 18, structural trusses comprised of bin rails 48 at the lower side, inboard upper rails 44 at the top side, and a plurality of diagonal tension members 50 extending diagonally from corner to corner of said truss.

Increased structural rigidity between cross sectional structural elements 11 may be provided by placing, at the mid-point between each said element, one additional trough shaped cross member 34 traversing the aircraft centerline 35, and terminating on each side at the lower end of stanchions 30 oriented in the z-axis 18 direction.

Figure 2:
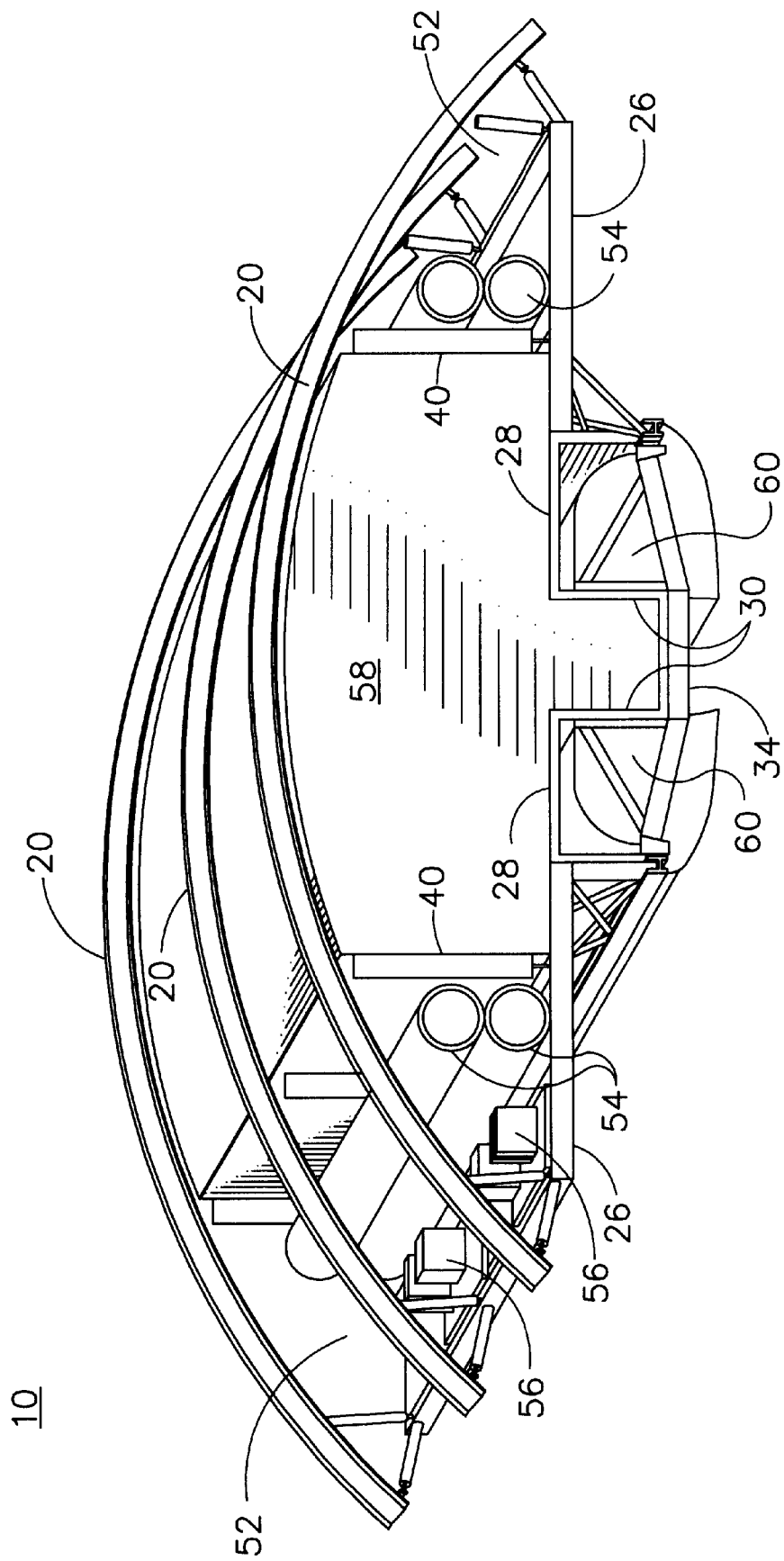
FIG. 2 is another partial perspective view of the overhead lattice support structure demonstrating space availability for bins, modules and equipment.

Referring now to FIG. 2, there is shown a partial perspective view of the lattice support structure 10 demonstrating how it provides space for center stowage bins, modules of various configurations, and various types of aircraft passenger cabin systems. As can be seen, two equipment spaces 52, one on each side of the aircraft, may be defined by the area bordered cross sectionally by the outer segments of the fuselage transverse frames 20, lattice beams 26, and inboard vertical tie rods 40. The equipment spaces 52 may be further defined to include the entire length of the aircraft's passenger compartment, and may be usable for the routing of ducts 54, tubes and electrical harnesses (not shown), and the housing of electrical equipment 56.

A second and much larger module space 58 may be defined by the area bordered cross sectionally by the central portion of the fuselage transverse frames 20, inboard vertical tie rods 40, inboard lattice beams 28, stanchions 30, and the center portion of the trough shaped cross member 34. The module space 58 may be further defined to include the entire length of the aircraft's passenger compartment, and may be usable for housing overhead modules, such as pilot and passenger attendant rest areas, which may include beds, bunks, and other similar modules.

Two center bin spaces 60 may also be provided on each side of the aircraft to accommodate the passenger baggage center stowage bins. Each may be defined by the area bordered cross sectionally by the inboard lattice beams 28, the stanchions 30, and the vertical structural truss which is itself comprised of bin rails 48, inboard upper rails 44, and diagonal tension members 50. The two center bin spaces 60 may be further defined to include the entire length of the aircraft's passenger compartment.

The uniqueness of the inventive lattice structure support structure 10 may be its flexibility on both the main deck and in the crown of the aircraft's passenger compartment in that it allows for placement of modules and equipment at approximately one-inch increments, and also adds the option of placing modules in the overhead. One of the key technical challenges of supporting stowage bins and overhead modules in a single structure may be the need to provide adequate stiffness. The lattice concept accomplishes this by the use of diagonal tension members 50 (FIG. 1). These diagonal tension members 50 act as a horizontal truss. Additionally, to provide lateral support, the stowage bin module (center bin space 60 in FIG. 2) is used as a primary lateral load path.

To make the design more weight efficient, and maximize overhead space the lattice support structure 10 and the stowage bin modules (center bin space 60) may also provide the structural floor of the overhead modules. The primary load path for the overhead mass may be driven directly to the lattice support structure 10. This allows for the overhead modules to be lighter since they do not carry any load other than their own weight. It also allows the overhead modules to be moved on increments to match aircraft customer specific main deck configuration.

Figure 3:
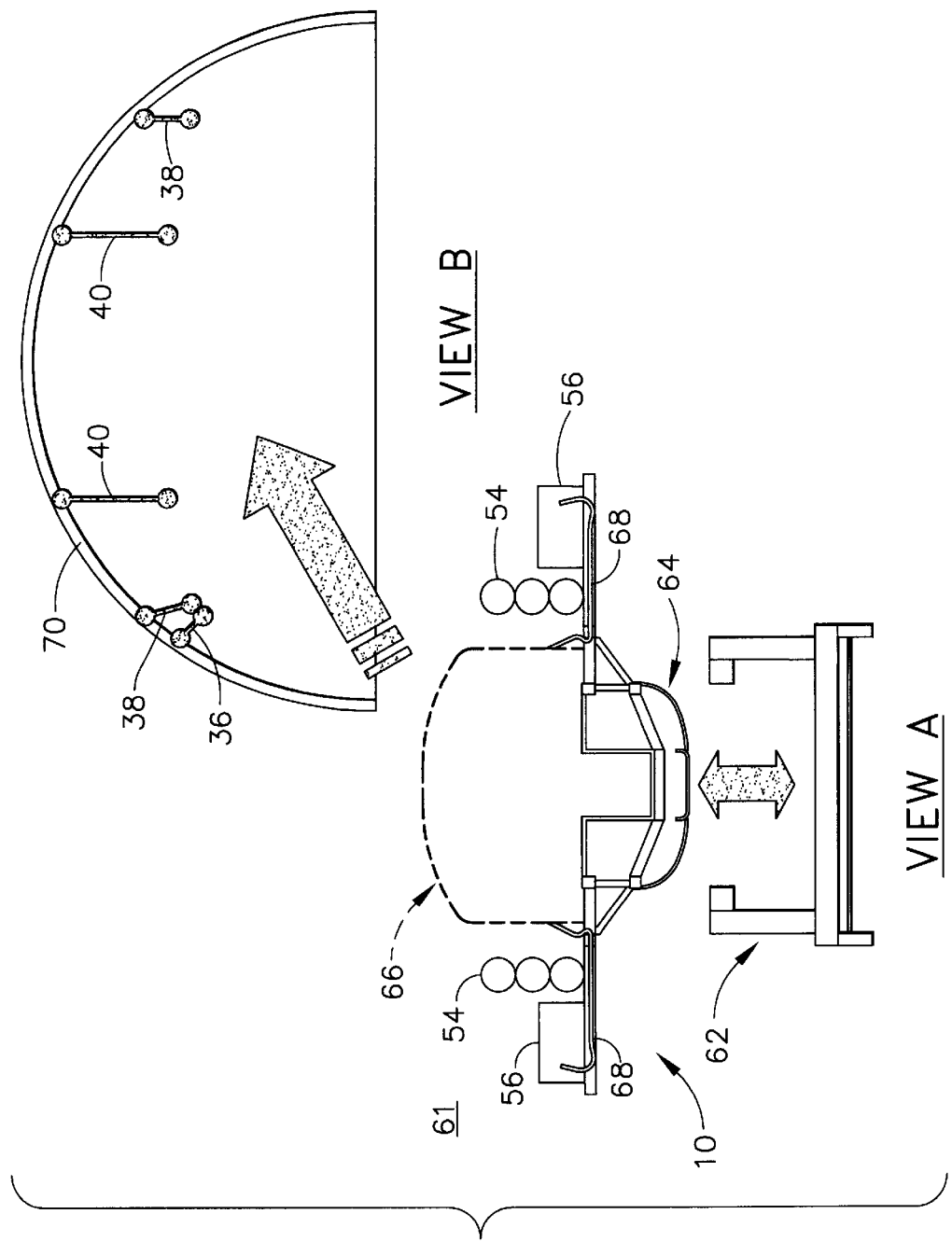
FIG. 3 is a flow diagram, including cross sectional views, of the inventive lattice support structure assembly process.

FIG. 3 illustrates the simplified assembly flow process of the inventive lattice support structure 10 on a typical passenger aircraft fuselage. View A shows the completely assembled overhead lattice support structure assembly 61 being transported to the aircraft assembly facility on a transport and lift tool 62 capable of both horizontal and vertical translation. The lattice support structure 10 and its systems and components may be assembled in a remote sub-assembly facility, and may be comprised of all necessary structural elements as well as overhead stowage bins 64, modules 66 (such as crew rest modules), ducts 54, electrical equipment 56, wiring 68, and other aircraft systems.

View B of FIG. 3 illustrates the aircraft fuselage body section 70 which starts empty except for the tie rods, (lateral tie rods 36, outboard vertical tie rods 38, and inboard vertical tie rods 40) which have been pre-attached to receive the overhead lattice support structure assembly 61. The completed assembly may then be rolled onto the aircraft fuselage body section 70, lifted and aligned by means of the transport and lift tool 62.

The inventive overhead lattice support structure design provides significant benefits during aircraft assembly operations and is far simpler than the current assembly process. The design allows more systems (ducting and electrical) to be pre-installed in a back shop and then lifted up into the airplane as an entire unit. The pre-installation process reduces flow time in final assembly by reducing the number of tie rods that must be installed and the number of system connections that must be done in the airplane.

It should be understood, of course, that the foregoing relates to preferred embodiments of the invention and that modifications may be made without departing from the spirit and scope of the invention as set forth in the following claims.

We claim:

1. A lattice support structure, comprising
   a plurality of horizontally oriented lattice beams;
   a plurality of vertically oriented stanchions secured to said lattice beams;
   a plurality of angled braces connected diagonally between said horizontally oriented lattice beams and said vertically oriented stanchions;
   a plurality of horizontally oriented trough shaped cross members secured to said stanchions;
   a plurality of vertically oriented tie rods securing said horizontally oriented lattice beams to an airplane's fuselage transverse frame;
   a plurality of laterally oriented lateral tie rods securing said horizontally oriented lattice beams to said airplane's fuselage transverse frame;
   a plurality of airplane fuselage rail beams connected to the outermost end of said each said horizontally oriented lattice beams;
   two horizontally oriented structural panels comprised of a shear panel and two rail beams, said structural panels being connected to the innermost end of each said horizontally oriented lattice beams;
   two vertically oriented structural trusses connected to the innermost end of said horizontally oriented lattice beams, and being comprised of a plurality of diagonal tension members extending diagonally between two rail beams, one said rail beam being also connected to said horizontally oriented structural panels;
   whereby said lattice support structure provides overhead space and structural support for passenger luggage center stowage bins, for aircraft systems, and for overhead modules.

2. The lattice support structure of claim 1, further comprising structural elements symmetrically spaced apart to provide adequate stiffness, lateral support, and load carrying capability.

3. The lattice support structure of claim 1, wherein said horizontally oriented lattice beams each comprises an outboard lattice beam and an inboard lattice beam rigidly connected to the outboard lattice beam.

4. The lattice support structure of claim 1, further comprising structural elements symmetrically spaced apart to allow for placement of modules and equipment at convenient dimensional increments.

5. The lattice support structure of claim 1, further comprising structural elements made of aluminum alloys.

6. The lattice support structure of claim 1, further comprising structural elements made of materials commonly employed for airframe structures.

7. The lattice support structure of claim 1, further comprising structural connections between said lattice support structure elements of the type commonly employed for airframe structures.

8. A lattice support structure, comprising
   horizontally oriented lattice beams secured to vertically oriented stanchions;
   angled braces connected diagonally between said horizontally oriented lattice beams and said vertically oriented stanchions;
   horizontally oriented cross members secured to said stanchions;
   vertically oriented tie rods securing said horizontally oriented lattice beams to an airplane's fuselage transverse frame;
   laterally oriented lateral tie rods securing said horizontally oriented lattice beams to said airplane's fuselage transverse frame;
   airplane fuselage rail beams connected to the outermost end of each said horizontally oriented lattice beams;
   two horizontally oriented structural panels connected to the innermost end of each said horizontally oriented lattice beams;
   two vertically oriented structural trusses connected to the innermost end of said horizontally oriented lattice beams;
   whereby said lattice support structure provides overhead space and structural support for center stowage bins, for aircraft systems, and for overhead modules.

9. The lattice support structure of claim 8, further comprising structural elements that provide adequate stiffness, lateral support, and load carrying capability.

10. The lattice support structure of claim 8, wherein each of said horizontally oriented lattice beams comprises an outboard lattice beam and an inboard lattice beam.

11. The lattice support structure of claim 8, further comprising structural elements that allow placement of modules and equipment at convenient dimensional increments.

12. The lattice support structure of claim 8, further comprising structural elements made of materials commonly employed for airframe structures.

13. The lattice support structure of claim 8, further comprising structural connections of the type commonly employed for airframe structures.

14. A lattice support structure, comprising:
   horizontally oriented lattice beams;
   vertically oriented stanchions;
   vertically oriented structural trusses;
   angled braces;
   horizontally oriented cross members:
   vertically and laterally oriented tie rods;
   horizontally oriented structural panels;
   whereby said lattice support structure is interconnected and spaced apart to provide overhead space and structural support for center stowage bins, for aircraft systems, and for overhead modules.

15. The lattice support structure of claim 14, further comprising diagonal tension members.

16. The lattice support structure of claim 14, further comprising structural elements that allow placement of modules and equipment at convenient dimensional increments.

17. The lattice support structure of claim 14, further comprising structural elements and structural connections made of materials and techniques commonly employed for airframe structures.

18. A method of accommodating and supporting overhead stowage bins, modules and aircraft systems, comprising the steps of:
   suspending a lattice support structure from the overhead structure of an aircraft's fuselage;
   locating said overhead stowage bins on each side of the underside of said suspended lattice support structure;
   locating said modules on the center segment of said suspended overhead stowage bins;
   locating said aircraft systems and components on each side of the upper side of said suspended lattice support structure.

19. The method of claim 18, wherein said lattice support structure comprises diagonal tension members.

20. The method of claim 18, further comprising a step of supporting, from said lattice support structure, modules and equipment located at convenient dimensional increments.

21. A method of accommodating and supporting overhead stowage bins, modules, and aircraft systems, comprising installing a lattice support structure, according to claim 1, in the fuselage of an aircraft.

22. A method of supporting interior elements of an aircraft within an aircraft fuselage, comprising:
   arranging a plurality of horizontally oriented lattice beams along a common longitudinal axis;
   securing each said horizontally oriented lattice beam to any adjacent vertically oriented stanchion with an angled brace;
   securing horizontally oriented cross members to said vertically oriented stanchions; and
   securing vertically oriented tie rods to said horizontally oriented lattice beams to an airplane's fuselage transverse frame.

23. The method of claim 22, further comprising securing said horizontally oriented lattice beams to said airplane's fuselage transverse frame with laterally oriented tie rods.

24. The method of claim 22, further comprising connecting the outermost end of each of said horizontally oriented lattice beams with an airplane fuselage rail beam.

25. The method of claim 22, further comprising connecting at least one horizontally oriented structural panel to the innermost end of each of said horizontally oriented lattice beams.

26. The method of claim 25, wherein at least two horizontally oriented structural panels are connected to the innermost end of each of said horizontally oriented lattice beams.

27. The method of claim 22, further comprising connecting at least one vertically oriented structural truss to the innermost end of each of said horizontally oriented lattice beams.

28. The method of claim 27, wherein at least two vertically oriented structural trusses are connected to the innermost end of each of said horizontally oriented lattice beams.

29. A lattice support structure, comprising:
   an airplane's fuselage transverse frame;
   horizontally oriented lattice beams;
   vertically oriented stanchions;
      said horizontally oriented lattice beams secured to said vertically oriented stanchions;
   angled braces;
      said angled braces connected between said horizontally oriented lattice beams and said vertically oriented stanchions;
   horizontally oriented cross members;
      said horizontally oriented cross members secured to said vertically oriented stanchions;
   vertically oriented tie rods;
      said vertically oriented tie rods secured to said horizontally oriented lattice beams;
      said horizontally oriented lattice beams secured to said airplane's fuselage transverse frame;
   laterally oriented tie rods;
   an airplane fuselage rail beam;
      said airplane fuselage rail beam connected to the outermost end of each said horizontally oriented lattice beams;
   two horizontally oriented structural panels;
      said two horizontally oriented structural panels connected to the innermost end of the each said horizontally oriented lattice beams;
   two vertically oriented structural trusses;
      said two vertically oriented structural trusses connected to the innermost end of said horizontally oriented lattice beams;
   wherein said lattice support structure provides overhead space and structural support for center stowage bins, for aircraft systems, and for overhead modules.

30. A lattice support structure, comprising:
   an airplane's fuselage transverse frame;
   horizontally oriented lattice beams;
   vertically oriented stanchions;
      said horizontally oriented lattice beams secured to said vertically oriented stanchions;

angled braces;
  said angled braces connected between said horizontally oriented lattice beams and said vertically oriented stanchions;
horizontally oriented cross members;
  said horizontally oriented cross members secured to said vertically oriented stanchions;
vertically oriented tie rods; and
  said vertically oriented tie rods secured to said horizontally oriented lattice beams.

31. The lattice support structure of claim 30, wherein said horizontally oriented lattice beams are secured to said airplane's fuselage transverse frame.

32. The lattice support structure of claim 30, further comprising laterally oriented tie rods.

33. The lattice support structure of claim 30, further comprising an airplane fuselage rail beam.

34. The lattice support structure of claim 33, wherein said airplane fuselage rail beam is connected to the outermost end of each of said horizontally oriented lattice beams.

35. The lattice support structure of claim 30, further comprising at least one horizontally oriented structural panel.

36. The lattice support structure of claim 35, wherein said at least one horizontally oriented structural panel is connected to the innermost end of at least one of said horizontally oriented lattice beams.

37. The lattice support structure of claim 30, further comprising at least one vertically oriented structural truss.

38. The lattice support structure of claim 37, wherein said at least one vertically oriented structural truss is connected to the innermost end of at least one of said horizontally oriented lattice beams.

39. The lattice support structure of claim 30, wherein said lattice support structure provides overhead space and structural support for center stowage bins, for aircraft systems, and for overhead modules.

* * * * *